Sept. 15, 1925.  1,553,541
E. G. LEWIS
AUTOMOBILE HEADLIGHT
Filed Jan. 2, 1924
Fig. 1
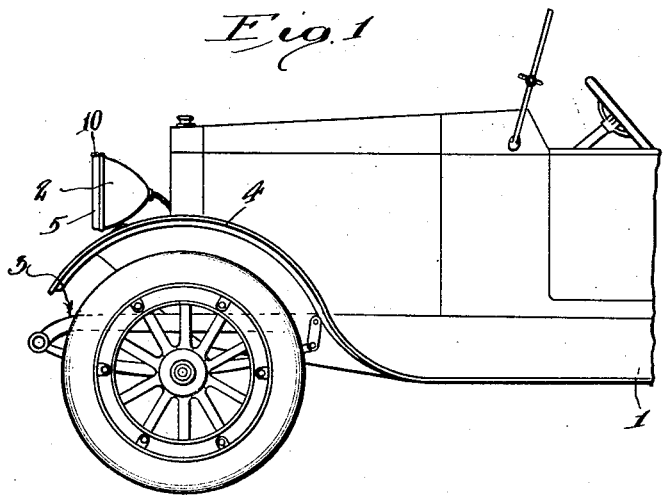
Fig. 2
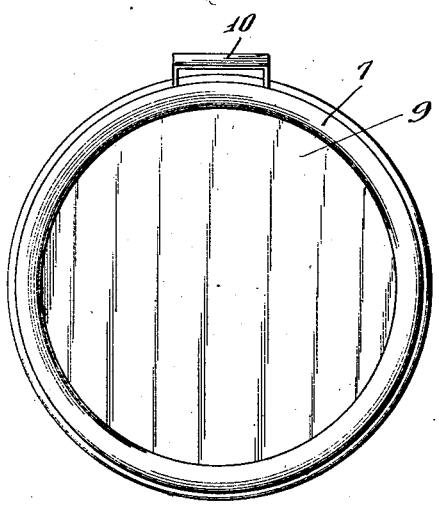
Fig. 3.
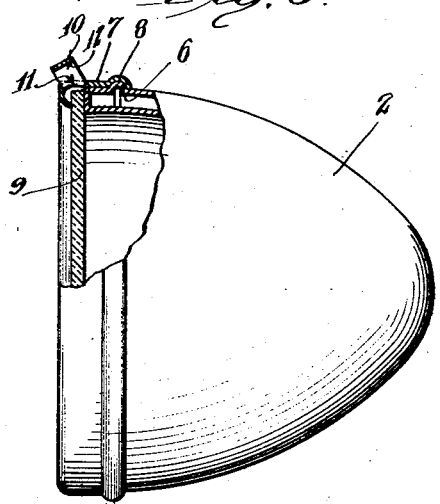
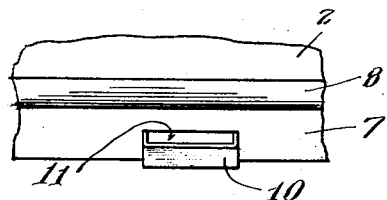
Fig. 4
Inventor
Edward G. Lewis
By Lyon & Lyon
Attorneys Patented Sept. 15, 1925.

1,553,541

UNITED STATES PATENT OFFICE.

EDWARD G. LEWIS, OF LOS ANGELES, CALIFORNIA, ASSIGNOR TO MABLE G. LEWIS, OF ATASCADERO, CALIFORNIA.

AUTOMOBILE HEADLIGHT.

Application filed January 2, 1924. Serial No. 683,948.

*To all whom it may concern:*

Be it known that I, EDWARD G. LEWIS, a citizen of the United States, residing at Los Angeles, in the county of Los Angeles, State of California, have invented a new and useful Improvement in Automobile Headlights, of which the following is a specification.

This invention relates to automobile headlights and is more particularly directed to a device for determining from the driver's seat of the automobile whether or not the headlights are lighted.

Every city, county and State of this country, as well as those of foreign countries, require automobiles to have burning two headlights at night; for their own protection as well as the protection of other autoists and pedestrians. Automobile headlights, as now constructed, make it extremely difficult for the occupants of the automobile to determine whether or not their headlights are lighted, on well lighted streets. When driving in the country it is common to see automobiles with only one headlight burning, of which fact the driver is usually unaware; however, this loss of one light, while on the highway, makes driving dangerous and often results in the driver being arrested, although he may be, and usually is, totally unaware of the fact that he is violating the law in this regard.

An object of this invention is to provide a simple means for telling the driver whether or not his lights are burning.

An object of this invention is to provide such an attachment to automobile headlights that will not destroy the beauty of design of said headlights.

An object of this invention is to provide such an attachment to automobile headlights that will not reflect a strong beam of light toward the automobile occupants to impair their vision.

Other objects will be apparent from the following detailed description of a preferred embodiment of this invention, as illustrated by the accompanying drawings:

In the drawings:—

Figure 1 is a side elevation of an automobile showing a headlight attached thereto, embodying this invention.

Fig. 2 is a front view of an automobile headlight embodying this invention.

Fig. 3 is a side elevation thereof, partly broken away, to show a device embodying this invention positioned on said headlight.

Fig. 4 is an enlarged fragmental view of a portion of an automobile headlight, showing the light tell-tale device attached thereto.

In the drawing, 1 indicates an automobile, having headlights 2 secured to the automobile frame 3, or to fenders 4, in any desired manner.

The outer frame 5 of the automobile headlight has a lip 6 pressed therein. A rim 7, having a lip 8, is adapted to hold the glass 9 to the headlight frame 5.

A U-shaped light deflecting member 10 is pressed in the rim 7, or the U-shaped member 10 may be made separately and a hole 11 punched in the rim 7 and the member 10 secured to the rim 7 directly over the hole 10. However, it is to be understood that I do not wish to limit myself to the member 10 being positioned as shown in the drawings, it being obvious that the same result may be obtained by positioning the member 10 in many other positions on the headlight.

I prefer to nickel or polish the under side 12 of the member 10 so that the light may be more effectually reflected.

The operation of this invention is as follows:—

Light from the reflectors of the headlight strikes the glass and a portion of the light is diffused at the point where the member 10 is positioned and is defracted through the hole 11 to strike the under, bright surface 12 of the member 10. The driver of the automobile, by looking at his headlights, from his seat can immediately observe whether or not the headlights of his automobile are burning; should one light be out he is immediately warned and may stop and fix the same.

Having fully described a preferred embodiment of my invention, it is to be understood that the same may be varied in detail, without departing from the spirit of the invention as pointed out in the following claim.

I claim:—

In an automobile headlight, the combination of a frame, reflecting means positioned within the frame, a rim secured to the frame and adapted to hold a glass in position, a slot in the rim and means secured over said slot and slanted forwardly for the fusing of light rearwardly so as to be observable by the operator of the automobile for telling of the burning of the light in said headlight.

Signed at Los Angeles, California, this 21st day of December 1923.

EDWARD G. LEWIS.